United States Patent
Gynn

(10) Patent No.: US 9,641,485 B1
(45) Date of Patent: May 2, 2017

(54) SYSTEM AND METHOD FOR OUT-OF-BAND NETWORK FIREWALL

(71) Applicant: PacketViper, LLC, West Mifflin, PA (US)

(72) Inventor: Daniel T. Gynn, Allison Park, PA (US)

(73) Assignee: PacketViper LLC, Pittsburgh, PA (US)

( * ) Notice: Subject to any disclaimer, the term of this patent is extended or adjusted under 35 U.S.C. 154(b) by 44 days.

(21) Appl. No.: 14/788,560

(22) Filed: Jun. 30, 2015

(51) Int. Cl.
*H04L 29/06* (2006.01)

(52) U.S. Cl.
CPC .......... *H04L 63/0254* (2013.01); *H04L 63/10* (2013.01)

(58) Field of Classification Search
CPC ............................ H04L 63/0254; H04L 63/10
USPC .......................................................... 726/13
See application file for complete search history.

(56) References Cited

U.S. PATENT DOCUMENTS

| | | | |
|---|---|---|---|
| 6,751,738 B2 | 6/2004 | Wesinger, Jr. et al. | |
| 7,721,084 B2 | 5/2010 | Salminen et al. | |
| 8,082,578 B2 | 12/2011 | Izatt et al. | |
| 8,528,041 B1 | 9/2013 | Haney et al. | |
| 8,555,368 B2 | 10/2013 | Waskiewicz et al. | |
| 8,745,219 B2 | 6/2014 | Carley | |
| 8,873,367 B2 | 10/2014 | Perras et al. | |
| 9,038,151 B1 * | 5/2015 | Chua ....................... | H04L 45/02 709/223 |
| 2003/0226034 A1 * | 12/2003 | Howard .............. | H04L 63/1458 726/22 |
| 2006/0143699 A1 * | 6/2006 | Nagata ................ | H04L 63/0227 726/11 |
| 2006/0248588 A1 * | 11/2006 | Jayaraman .......... | H04L 63/1458 726/22 |
| 2007/0061893 A1 * | 3/2007 | Black ...................... | G06F 21/10 726/27 |
| 2009/0249472 A1 * | 10/2009 | Litvin ................. | H04L 63/0263 726/14 |
| 2010/0212014 A1 * | 8/2010 | Becker ................ | H04L 63/1458 726/23 |
| 2011/0016526 A1 * | 1/2011 | Oh ....................... | H04L 63/1458 726/23 |
| 2013/0227690 A1 * | 8/2013 | Kawaguchi ........... | H04L 63/145 726/23 |

(Continued)

OTHER PUBLICATIONS

Paul A. Watson, Slipping in the Window: TCP Reset Attacks, technical whitepaper, Dec. 25, 2003, www.terrorist.net.

*Primary Examiner* — Michael S McNally
(74) *Attorney, Agent, or Firm* — The Ronald Law Group, LLC

(57) ABSTRACT

The present invention is a system and method for an out-of-band network firewall where a firewall, packet-filtering device receives mirrored data packet traffic between a remote host and local host. The out-of-band firewall then will determine if traffic between the remote host and local host should be blocked, and if so then the firewall will send a forged data packet to the remote host and the local host to sever the communication between the hosts. The firewall system may forge a TCP reset packet (RST packet) using the mirrored data packets such that when the TCP reset packet is sent, the hosts will believe that the other respective host is requesting that the connection be reset and terminated. If the firewall receives the mirrored packets from an agent connected to a local host, then the firewall will instruct the agent to block future traffic from the blocked host.

20 Claims, 5 Drawing Sheets

(56) References Cited

U.S. PATENT DOCUMENTS

2015/0334090 A1* 11/2015 Ling .................. H04L 63/0254
726/13

* cited by examiner

SYSTEM AND METHOD FOR OUT-OF-BAND NETWORK FIREWALL

FIELD OF INVENTION

The present invention relates to methods for filtering network traffic through a network firewall and the manner in which the network traffic flows through the system.

BACKGROUND OF INVENTION

The current state-of-the-art for network firewalls, packet analyzers, and filters is for the firewall device, either a physical "box" or a virtual machine, to receive network traffic in-line (in series) with the rest of the network traffic. The standard configuration of such a firewall is for the device to sit between a local host and remote host, where all network traffic between the two hosts must pass through and clear the firewall before being sent to its destination. The use of an in-line packet filter is customary because of its effectiveness in being able to block in real-time any connections containing malicious network traffic.

Despite this effectiveness, in-line filtering is not always practical to implement with the latest types of network devices and designs. One example of when an in-line packet filter may not be practical is in a hosted environment, such as those provided by Virtual Private Servers (VPS's), or cloud network providers, such as Amazon's Virtual Private Cloud (VPC) and Elastic Compute Cloud (EC2) services. These challenges with the cloud systems are due to the difficulty in configuring such in-line firewalls to operate properly. Similarly, under network outage conditions, in-line firewalls will not be operating properly. In-line filters can also be a problem for users who are running devices that are extremely sensitive to network latency. Likewise, it may be beneficial to users of a network tap that monitors network traffic to filter the traffic if a malicious connection is detected. What is needed, therefore, is a network firewall that has the ability to perform all of the functions of an in-line firewall, but can minimize network latency, perform under network outage conditions, work in a hosted or cloud environment and can also take advantage of unique, previously unknown benefits of being out-of-band of the flow of network traffic.

SUMMARY OF INVENTION

Currently there are no out-of-band packet filters that analyze network traffic and send spoofed or forged packets to the host endpoints to sever the connections if the traffic should be blocked. The present invention provides an out-of-band (parallel to network traffic) method of packet filtering. Current firewalls filter network traffic by sitting in the flow of traffic and deciding if the packet should pass the device on the way to their final destination. The present invention works by having network traffic mirrored to the inventive system via a port mirroring protocol or an agent installed on an endpoint device, such as a mail server or user terminal. Once the inventive system receives the mirrored traffic, it decides if the packet should have been allowed to pass or not. If not, it will send a TCP reset packet (RST packet), ICMP unreachable packet or other similar transmission as applicable to both endpoints alerting them to drop the connection. It will send these packets to both the sender and the receiver, spoofing or falsifying the source address and other packet information to make it look like the other end is requesting that the connection be closed.

Additional features found in the present invention include the use of an agent system that may reside on the endpoint user's system. This agent system may mirror the network traffic to the firewall system. When the firewall system blocks an endpoint host, it may send a message to all of the agent systems that the firewall system is connected to, so to cause the agent systems to block all future network traffic with the blocked host. In this method, the firewall system may act as centralized source for firewall rules for all agents within a protected network. Furthermore, the agents may allow for customized and advanced firewall settings for each endpoint user device.

DETAILED DESCRIPTION OF THE INVENTION

The following detailed description includes the best currently contemplated modes of carrying out exemplary embodiments of the invention. The description is not to be taken in a limiting sense, but is made merely for the purpose of illustrating the general principles of the invention, since the scope of the invention is best defined by the claims included herein.

Figure 1:
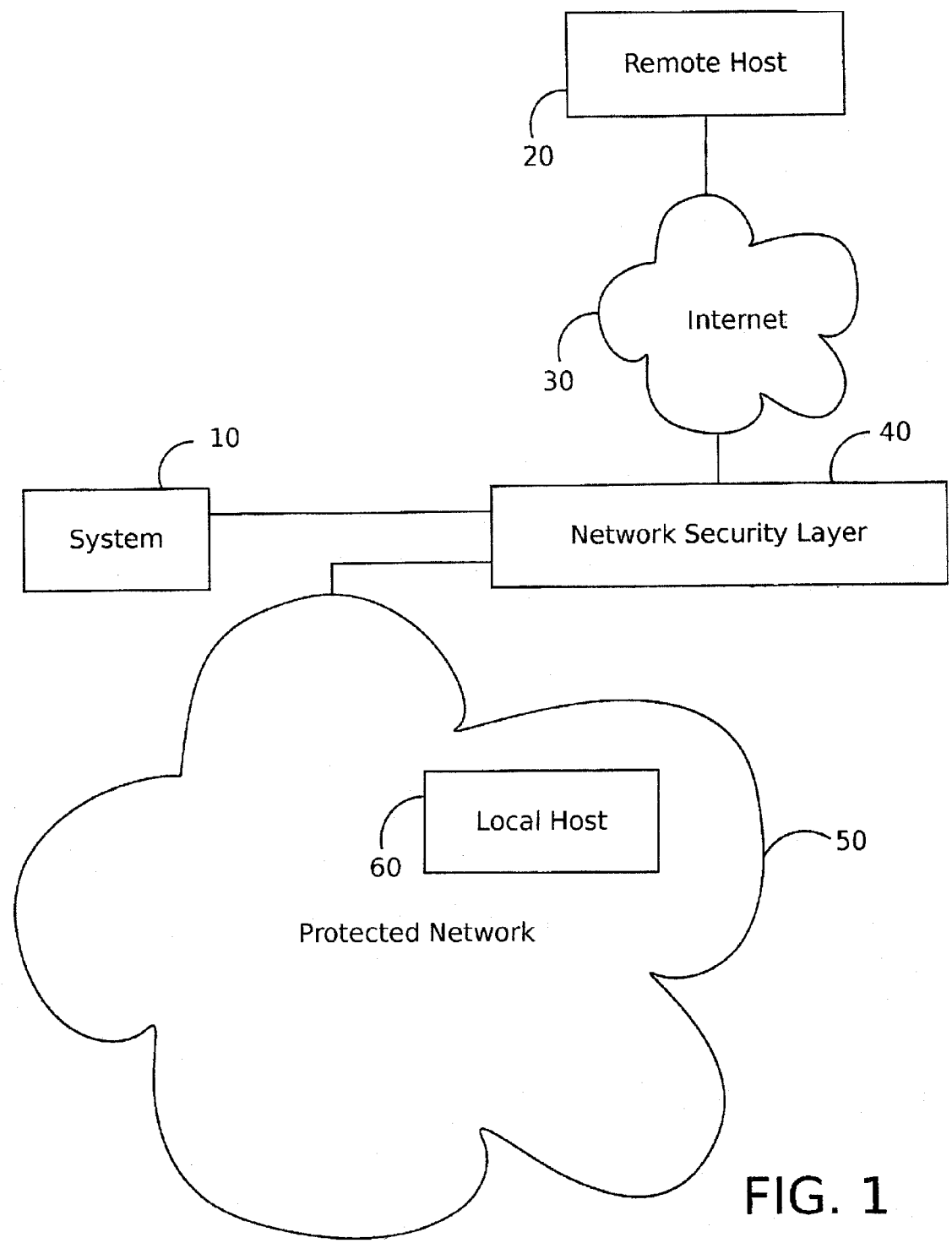
FIG. 1 is a diagram of an exemplary embodiment of the network system of the present invention.

FIG. 1 depicts the inventive firewall system 10 in operable communication with a network security layer 40. The network security layer 40 is in operable communication with a local protected network 50 that may contain a local host 60. The network security layer 40 is also connected to a broader network 30, which may be the Internet or another outside computer network. Through the broader network 30, the network security layer 40 may also be in operable communication with a remote host 20. The system 10 may by physically connected to the network security layer 40 via a physical connection such as a hardwire direct connection or the system 10 may be a virtual machine operating as software on the network security layer 40. The network security layer 40 may be a server or switch device such as a Cisco product as will be known within the art. The local protected network 50 may be a local area network or other protected networks as is already known within the art. The local host 60 may be an individual user's machine or other device that is connected to local protected network 50 and has the ability to access the broader outside network 30.

In the embodiment in FIG. 1, the remote host 20 is in operable communication with the local host 60 by way sending IP packets through the network security layer 40. In one embodiment, the remote host 20 and local host 60 are connected via a TCP connection and are attempting to or have successfully negotiated the TCP 3-way handshake as known in the art. In this embodiment IP packets contain customary IP information such as sender and destination information, are sent from the remote host 20 to the local host 60 and from the local host 60 to the remote host 20, which constitutes the IP network traffic referred to throughout this description.

The network security layer 40 may be enabled to mirror all network traffic to the system 10 by using a technique such as Cisco's Switched Port Analyzer (SPAN) feature. Using this technique, the system 10 will receive copies of all network traffic that passes through the network security layer 40. In one scenario, the remote host 20 will initiate a network connection through the broader network 30 to the local host 60. The network security layer 40 will mirror all the IP traffic between the remote host 20 and local host 60 and send the mirrored traffic to the system 10. The system 10 will then analyze the traffic and determine if the connection to the remote host 20 should be blocked. If the system 10 determines the connection to the remote host 20 should be blocked, the system 10 will cause the connection between the remote host 20 and local host 60 to be broken. The system 10 will break the connection by sending an IP packet to one or both the remote host 20 and local host 60 to terminate the connection. These IP termination packets may take the form of a TCP reset packet, ICMP unreachable packet or other similar packets known in the art.

In order for the IP termination packets to be successfully received by a host and to terminate the connection, the IP termination packets must spoof or falsify its sender information, TCP sequence number and other information for the packet to be successfully inserted in the IP traffic. The information required to spoof the sender address of the IP termination packet is made available to the system 10 because all the IP traffic between the local host 60 and remote host 20 is made available to the system 10 in real time. As a result, the system 10 does not need to engage in any TCP sequence prediction, or other hacking methodologies, because all the information needed to falsify the sender address and other spoofing information will be known to the system 10. The result of spoofing the sender address is that the receiving host will believe that the sending host is requesting the connection be terminated which will cause the IP traffic to cease.

Figure 2:
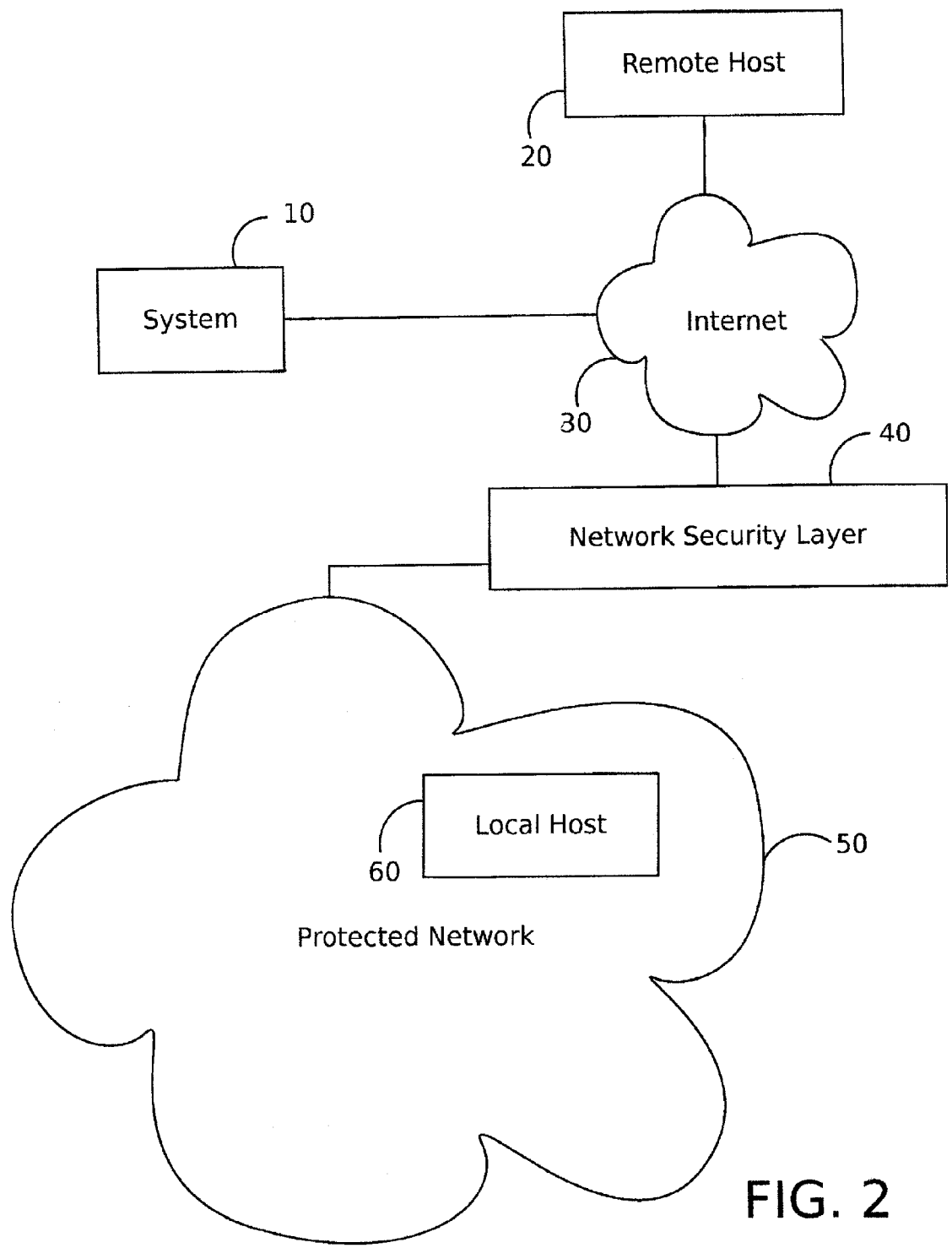
FIG. 2 is a diagram of an alternative embodiment of the network system of the present invention.

FIG. 2 depicts an embodiment of the present invention where the firewall system 10 is connected to the Internet 30, or any other broad computer network. In this configuration, the system 10 may reside on a third party server or operate in the "cloud" and act as virtual machine as a part of the firewall system. In this embodiment, the network security layer 40 may remotely mirror all IP traffic over the network 30. The network security layer 40 may use remote mirroring techniques such as Cisco's Remote Switched Port Analyzer (RSPAN) feature or the Encapsulated Remote Switched Port Analyzer (ERSPAN) feature. In this remote mirroring environment, the traffic from a port on a first switch may be mirrored to a port on a second switch, which is then connected to the system 10. The remote mirroring technique may employ two or more switches that may or may not be directly connected to each other before the mirrored traffic is received by the system 10. In each of these cases, all IP traffic between the remote host 20 and local host 60 is copied and sent for the system 10 to analyze and determine if the connection should be broken.

Figure 3:
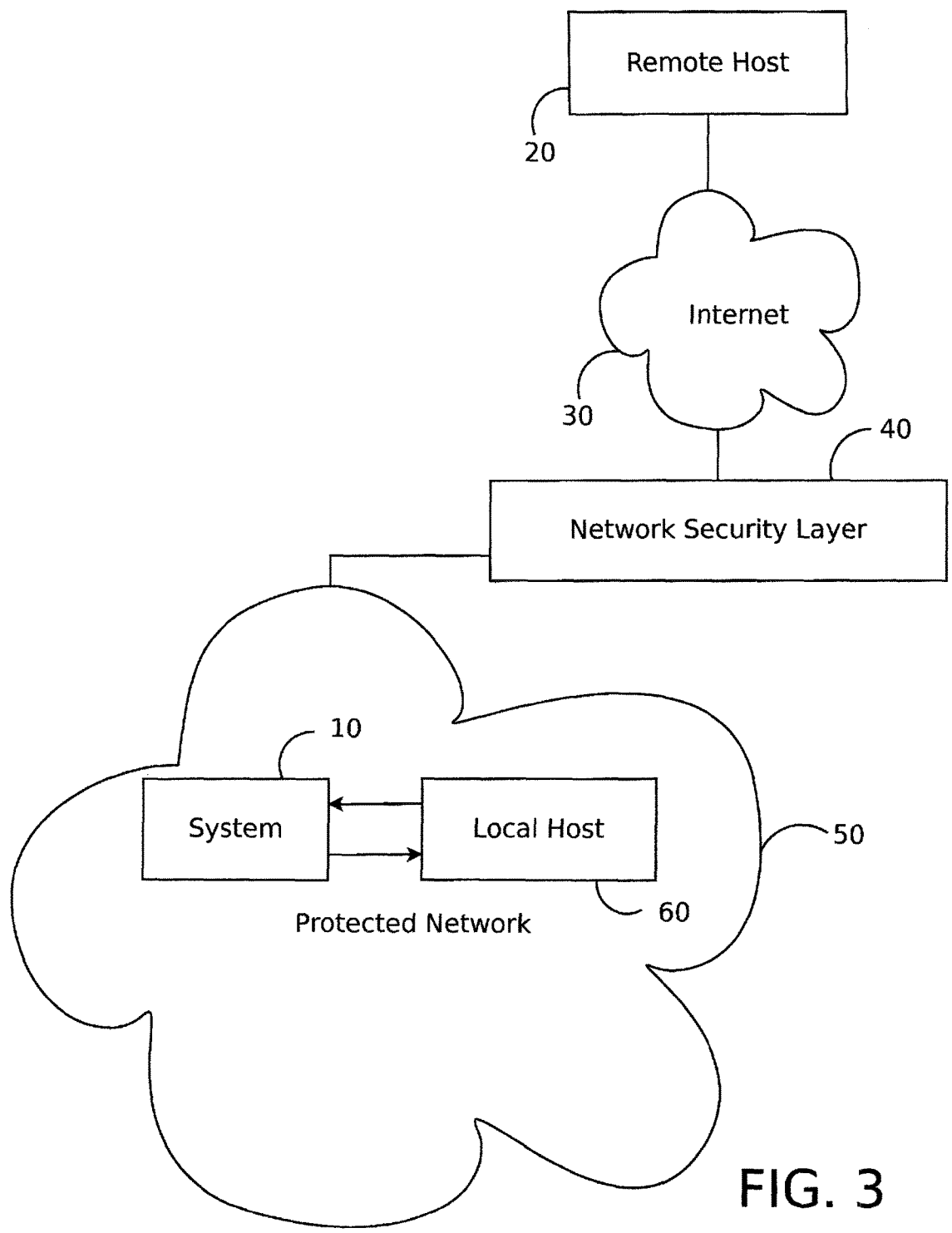
FIG. 3 is a diagram of an alternative embodiment of the network system of the present invention.

FIG. 3 depicts an alternative embodiment where the system 10 is contained within the protected local network 50. In this configuration, the system 10 is in direct operable commutation with the local host 60 via an agent system (not shown). The system 10 may, alternatively, be located anywhere that is network accessible to the agent system. The agent system may be a program that resides on the local host 60 that may have access to monitor and mirror all IP traffic that flows to and from the local host 60. In this embodiment, it is the agent system that may copy and mirror the IP traffic and all packet details to the system 10. Additionally, in this configuration there may be multiple local hosts 60 with multiple agent systems that mirror IP traffic to the system 10. The system 10 then is set up to analyze multiple IP traffic streams within a protected network 50. If the system 10 finds that a remote host's connection should be terminated, then the system 10 will send the termination packets to both the remote host 20 and local host 60. In one embodiment, the system may additionally send a message to every agent system within the protected local network 50 to block future packets from the remote host 20. In this configuration, the agent will prevent the flow of IP traffic from the remote host 20 and the agent system will not need to mirror future IP traffic from the remote host 20 to the system 10.

Figure 4:
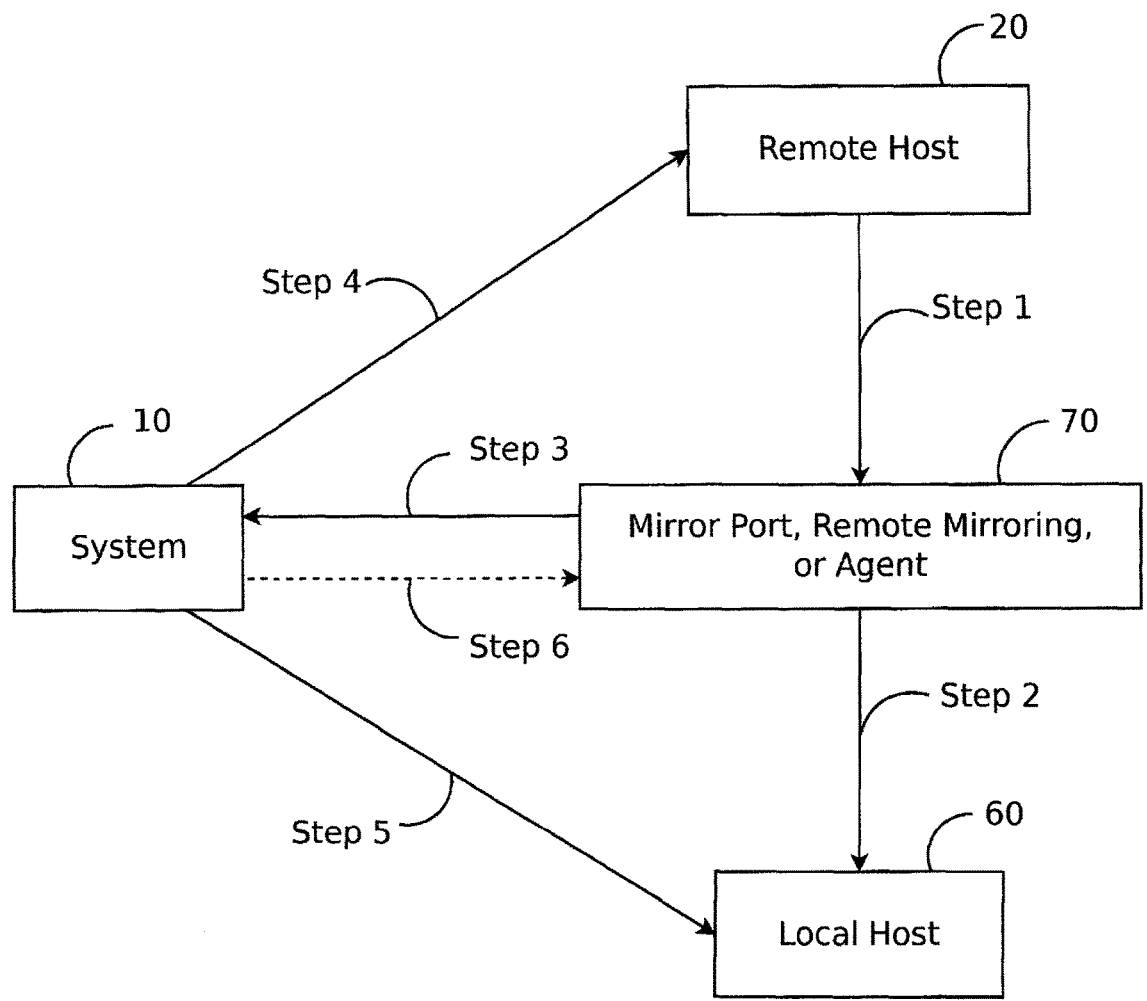
FIG. 4 is a diagram of an exemplary embodiment of the network system of the present invention.

FIG. 4 provides a diagram of how the IP packets may flow through the firewall system. In step 1 the remote host 20 may initiate a connection with the local host 60 by using the TCP 3-way handshake, i.e. the remote host 20 sends an SYN packet, which the local host 60 will respond with a SYN/ACK packet and upon receipt by the remote host 20, the remote host 20 sends an ACK packet to the local host 60. It may be assumed that there already exists a TCP connection between the remote host and local host in FIG. 4. When the packet travels to the local host 60, it must pass through the mirroring device 70. The mirroring device 70 may be the network security layer 40 or may be an agent running on the local host machine 60. Steps 2 and 3 may happen simultaneously where the packet from the remote host 20 is delivered to the local host 60 and a mirrored packet is delivered to the system 10. Once the system 10 is receiving the mirrored IP traffic, the system 10 may monitor the connections to determine if the remote hosts' 20 connections should be terminated. Steps 4 and 5 represent the transmission of the termination packet to the remote host 20 and local host 60 to sever the connection and stop the network traffic. The transmission of termination packet in steps 4 and 5 will occur when the system 10 determines that the connection from the remote host 20 must be terminated. In one embodiment, steps 4 and 5 may occur simultaneously. In another embodiment, if the system 10 receives the mirrored IP traffic from an agent system 70, the system 10 may proceed with step 6, where the system 10 sends a message to the agent 70 to block all future packets that are sent from the remote host 20. In this embodiment, the agent 70 will refuse all packets from the remote host 20 and the system 10 will not have to analyze any packets from the remote host 20 in the future.

Figure 5:
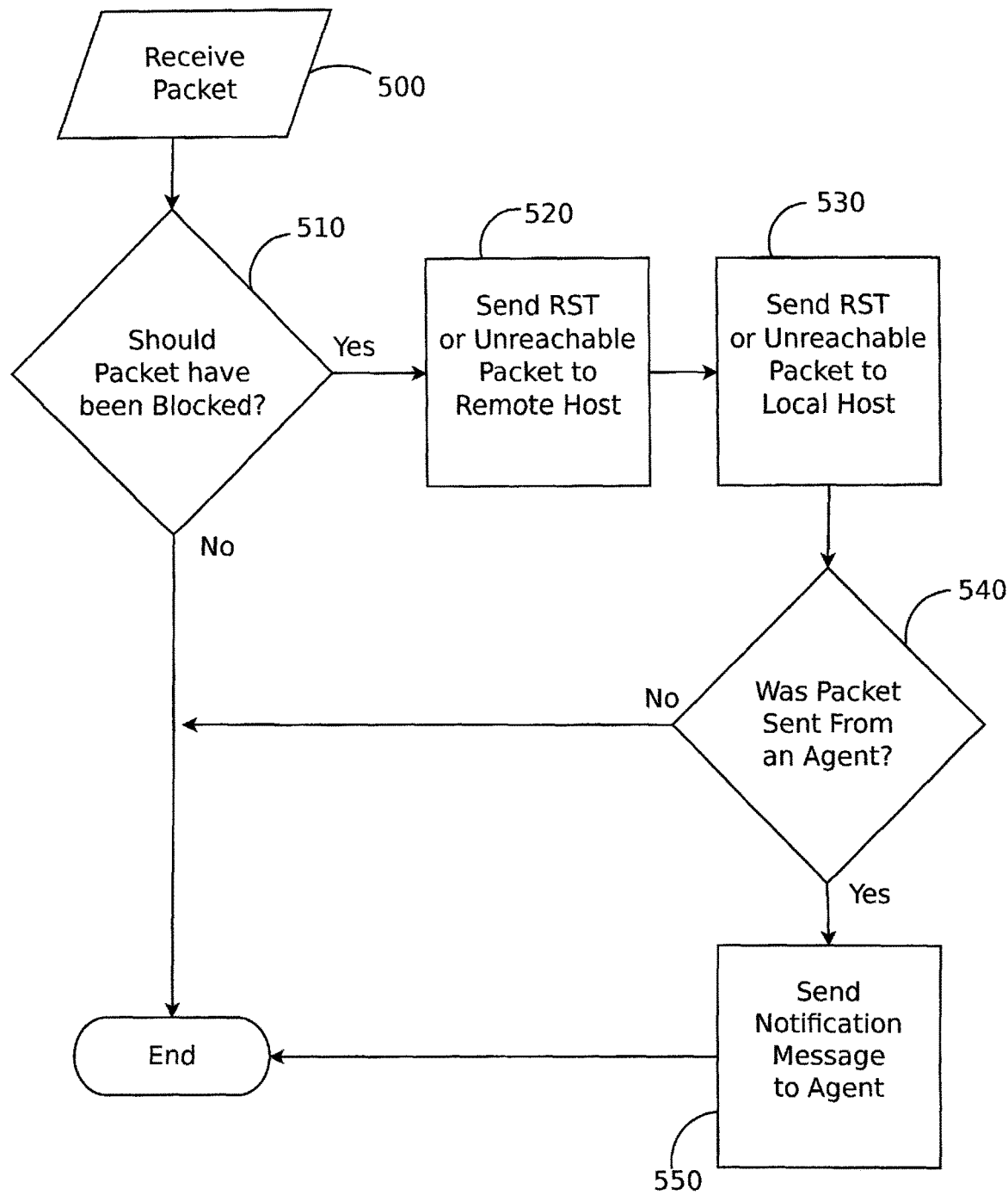
FIG. 5 illustrates a packet evaluation filtering system in accordance with an embodiment of the present invention.

FIG. 5 is a flowchart depicting the decision chain of the system in one embodiment. Once the system 10 receives a packet 500, it must decide if the packet should have been blocked 510. The decision on if the packet should have been blocked employs customary firewalling techniques that are known in the art. If the packet should not have been blocked, then the system 10 proceeds to prepare to analyze more incoming packets. If the packets should have been blocked, then the system 10 will send a RST or unreachable termination packet to the remote host 520, and a RST or unreachable termination packet to the local host 530. As discussed above, the termination packets may employ spoofing techniques so to fool the remote host 20 and local host 60 that each is requesting the termination of the connection. The system 10 will then decide if the mirrored packet was sent from an agent system 540 and if so, then send a message to the agent 70 to block all future connections from the remote host 550. If the packet was not sent from an agent then the system will prepare to analyze more incoming packets.

In an alternative embodiment the system 10 may be configured to filter and function with UDP protocol packets. In this connectionless configuration, the system may block the remote host 20 by using the ICMP unreachable packet so to stop the transmission of packets from the remote host 20. Persons with skill in the art will recognize that other communication protocols may also be used with the inventive system of placing the firewall system 10 out-of-line (parallel to) the flow of traffic. It will be recognized that use of other communication protocols, such as all other Internet Assigned Numbers Authority (IRNA) defined protocols, including "connectionless" protocols, will require minimal additional configuration to the system 10 in order to perform packet filtering and firewall functions.

The benefits of running the system 10 out-of-line (parallel to) the flow of network traffic is that firewall and packet filtering system 10 will not add latency to the protected network 50 or add latency to the local host 60 in connecting to the Internet 30. Additionally, in the case of certain "cloud" configurations, the network traffic can be mirrored to the present invention or an agent installed on the endpoint can send the traffic to the invention. It is customary for "cloud" based networks to force the user to only use their own firewall which may not have the advanced features or have the customized settings needed for a given user. The use of the inventive system, therefore allow for this customized firewalling of the "cloud" network in a manner that is much less complicated than what must be done to perform in-line filtering in "cloud" configurations.

Another added benefit of running the firewall out-of-line (parallel) to the network traffic, is that it may be used to perform the initial monitoring for testing of network configurations and other diagnostic and/or experimental networking setups. Running the system in parallel may also be used to serve as proof of concept for various experimental firewall settings. As a result, being able to then filter traffic in a testing environment is a benefit.

The use of the agent system may also provide the benefits of providing advanced firewalling capabilities and centralized network firewall policies even when the local host 60 is no longer within a traditional network security environment (such as when a laptop is taken offsite). The advanced firewalling capabilities may be geo-location blocking features, the ability to block individual hosts, and the ability to block only outbound or inbound packets, amongst other advanced features. The agent system also has the ability to bring these advanced firewalling capabilities to existing computers such as a standard Windows or Linux workstation or mobile devices such as cell phones or tablets without slowing down standard network requests. Additionally, the agent allows centralized network firewall policies, wherein the system 10 may set and update rules for all agents across the protected network. Examples of this rules update for all the agents across a network is seen with the notification to the agents of a blocked host 550 in FIG. 5.

The creation and transmission of the termination packet by the system 10 to the remote host 20 and local host 60 employs techniques similar to some computer networking hacking techniques. One of these techniques is called a TCP sequence prediction attack, where the hacker inserts packets into the stream of traffic traveling to a host. In order for the host to accept the packet, the packet must have the correct TCP sequence number, in addition to the proper addresses. The TCP sequence number attack technique exploits the TCP window size, which the hacker must guess, but if done correctly, allows the hacker to send a RST packet which resets the connection. When the connection is "reset" it results in the host severing the connection and discarding any subsequent packets sent from the "resetting" host.

The present invention differs from this technique in that it does not have to guess the TCP sequence number since it is fed the details of the packets from the mirrored copies the system 10 receives. Therefore, rather than having to send numerous packets as a part of the "guessing" process, the present invention only has to send one packet to each end-point. Thus, the similarity with the TCP reset attack is the manner in which a spoofed packet with an RST flag is inserted into network traffic. By using this technique, the present invention serves a legitimate network purpose as a firewall to limit protected network exposure to illegitimate network traffic rather than to disrupt legitimate network traffic.

One publication that discusses the related hacking technique is "Slipping in the Window-TCP Reset Attacks" by Paul A. Watson. In this publication, Watson discusses guessing the TCP Sequence number and window size to disrupt network communications. The present invention differs from this technique in that it does not have to guess at the TCP sequence number since it is fed the details of the packet.

I claim:

1. An out-of-band computer network firewall system, wherein a remote host sends packet data through a network to a local host, comprising:
   a computer for providing an interface to a user; and
   a network security layer implemented on at least one of a server and a switch device in operable communication with the computer;
   wherein the network security layer includes programmable hardware or virtual hardware, in operable communication with the computer, for implementing a firewall system;
   wherein the firewall system is in operable communication with a local host and a remote host and is the recipient of mirrored data packets that are mirrored copies of data packets that are sent from the remote host and that have the local host as their destination;
   wherein the firewall system sends at least one termination packet to at least one of the local host and the remote host such that the termination packet will cause the local host to no longer receive data packets from the remote host;
   wherein the data packets that are sent from the remote host that have the local host as their destination utilize at least one of a UDP protocol, an IANA approved protocol, and a TCP protocol;
   wherein the firewall system sends at least one ICMP unreachable packet to at least one of the local host or the remote host when the data packets utilize a UDP protocol or an IANA approved protocol; and
   wherein the firewall system sends at least one TCP reset packet to both the local host and the remote host simultaneously when the data packets utilize a TCP protocol.

2. The out-of-band computer network firewall system of claim 1, wherein the firewall system receives the mirrored data packets from a network security layer that is in operable communication with the local host and the firewall system.

3. The out-of-band computer network firewall system of claim 1, wherein the firewall receives the mirrored data packets sent through a plurality of network switches.

4. The out-of-band computer network firewall system of claim 1, wherein the firewall receives the mirrored data packets from an agent system that is in operable communication with the local host.

5. The out-of-band computer network firewall system of claim 4, wherein the firewall system provides information of blocked remote hosts to the agent system, wherein the agent system may block future data packets from blocked remote hosts.

6. The out-of-band computer network firewall system of claim 4, wherein the firewall system is in operable communication with a plurality of local hosts and a plurality of agent systems.

7. The out-of-band computer network firewall system of claim 4, wherein the firewall system provides information of blocked remote hosts to a plurality of agent systems, wherein the agent systems may block future data packets from blocked remote hosts.

8. An out-of-band computer network firewall system, wherein a remote host sends packet data through a network to a local host, comprising:
a computer for providing an interface to a user; and
a network security layer implemented on at least one of a server and a switch device in operable communication with the computer;
wherein the network security layer includes programmable hardware or virtual hardware, in operable communication with the computer, for implementing a firewall system;
wherein the firewall system is in operable communication with a local host and a remote host and is the recipient of mirrored data packets that are mirrored copies of data packets that are sent from the remote host and that have the local host as its destination;
wherein the firewall system sends at least one termination packet to at least one of the local host or the remote host such that the termination packet will cause the local host to no longer receive data packets from the remote host;
wherein the firewall receives the mirrored data packets sent through a plurality of network switches; and
wherein the firewall receives the mirrored data packets through the use of a Remote Switch Port Analyzer (RSPAN) or an Encapsulated Remote Switch Port Analyzer (ERSPAN).

9. The out-of-band computer network firewall system of claim 8, wherein the firewall receives the mirrored data packets from a network security layer that is in operable communication with the local host and the firewall system.

10. The out-of-band computer network firewall system of claim 8, wherein the firewall receives the mirrored data packets sent through a plurality of network switches.

11. The out-of-band computer network firewall system of claim 8, wherein the firewall receives the mirrored data packets from an agent system that is in operable communication with the local host.

12. The out-of-band computer network firewall system of claim 8, wherein the firewall system provides information of blocked remote hosts to the agent system, wherein the agent system may block future data packets from blocked remote hosts.

13. The out-of-band computer network firewall system of claim 8, wherein the firewall system is in operable communication with a plurality of local hosts and a plurality of agent systems.

14. The out-of-band computer network firewall system of claim 8, wherein the firewall system provides information of blocked remote hosts to a plurality of agent systems, wherein the agent systems may block future data packets from blocked remote hosts.

15. An out-of-band computer network firewall system, wherein a remote host sends packet data through a network to a local host, comprising:
a computer for providing an interface to a user; and
a network security layer implemented on at least one of a server and a switch device in operable communication with the computer;
wherein the network security layer includes programmable hardware or virtual hardware, in operable communication with the computer, for implementing a firewall system;
wherein the firewall system is in operable communication with a local host and a remote host and is the recipient of mirrored data packets that are mirrored copies of data packets that are sent from the remote host and that have the local host as its destination;
wherein the firewall system sends at least one termination packet to at least one of the local host or the remote host such that the termination packet will cause the local host to no longer receive data packets from the remote host;
wherein the data packets that are sent from the remote host that have the local host as their destination utilize a TCP protocol;
wherein the firewall system sends at one TCP reset packet to at least one of the local host or the remote host; and
wherein the firewall system forges at least one TCP reset packet such that it will be accepted by at least one of the remote host or local host.

16. The out-of-band computer network firewall system of claim 15, wherein the firewall system forges at least one TCP reset packet by using information from the mirrored data packets.

17. The out-of-band computer network firewall system of claim 15, wherein the firewall system receives the mirrored data packets from a network security layer that is in operable communication with the local host and the firewall system.

18. The out-of-band computer network firewall system of claim 15, wherein the firewall receives the mirrored data packets sent through a plurality of network switches.

19. The out-of-band computer network firewall system of claim 15, wherein the firewall receives the mirrored data packets from an agent system that is in operable communication with the local host.

20. The out-of-band computer network firewall system of claim 19, wherein the firewall system is in operable communication with a plurality of local hosts and a plurality of agent systems, wherein the firewall system provides information of blocked remote hosts to a plurality of agent systems, wherein the agent systems may block future data packets from blocked remote hosts.

* * * * *